(12) United States Patent
Labock

(10) Patent No.: US 11,473,878 B2
(45) Date of Patent: Oct. 18, 2022

(54) ARRANGEMENT FOR BALLISTICALLY PROTECTING A DRIVER OR PASSENGER IN A CIVILIAN VEHICLE

(71) Applicant: Doron Labock, Rishon-Lezion (IL)

(72) Inventor: Doron Labock, Rishon-Lezion (IL)

( * ) Notice: Subject to any disclaimer, the term of this patent is extended or adjusted under 35 U.S.C. 154(b) by 0 days.

(21) Appl. No.: 17/513,129

(22) Filed: Oct. 28, 2021

(65) Prior Publication Data

US 2022/0221253 A1 Jul. 14, 2022

Related U.S. Application Data

(60) Provisional application No. 63/106,413, filed on Oct. 28, 2020.

(51) Int. Cl.
*B60R 21/12* (2006.01)
*F41H 7/04* (2006.01)

(52) U.S. Cl.
CPC .............. *F41H 7/04* (2013.01); *B60R 21/12* (2013.01); *F41H 7/044* (2013.01)

(58) Field of Classification Search
CPC . F41H 5/013; F41H 5/06; F41H 7/046; F41H 7/044; F41H 7/04; F41H 7/048; B60R 21/12
See application file for complete search history.

(56) References Cited

U.S. PATENT DOCUMENTS

| | | | | |
|---|---|---|---|---|
| 3,632,155 A | * | 1/1972 | Parker | B60R 21/12 296/24.46 |
| RE27,942 E | * | 3/1974 | Setina | B60R 21/12 280/748 |
| 3,922,034 A | * | 11/1975 | Eggert | F41H 5/06 297/216.12 |
| 4,015,875 A | * | 4/1977 | Setina | B60R 21/12 49/379 |

(Continued)

FOREIGN PATENT DOCUMENTS

| CN | 207850188 U | 9/2018 |
|---|---|---|
| WO | 200900797 A3 | 1/2009 |

OTHER PUBLICATIONS

Top Car—armor and protection for private vehicles. Online at: https://13tv.co.il/item/special/recommended/economy/topcar-2219905/ <retreived Jun. 16, 2021>.

*Primary Examiner* — Joshua E Freeman
(74) *Attorney, Agent, or Firm* — The Roy Gross Law Firm, LLC; Roy Gross

(57) ABSTRACT

An arrangement for ballistically protecting a driver or passenger in a civilian vehicle comprises: (a) a back ballistic member mechanically securable to a rear surface of a back of a driver or passenger seat; (b) a first side ballistic member connected to the back member by at least one hinge such that the first side member is angularly displaceable relative to the back member; the first side ballistic member comprising a transparent ballistic portion; and (c) a second side member (Continued)

connected to the back member at an opposite side of the back member. The second member is linearly adjustable relative to the back portion such that mechanical contact between the back of the driver or passenger seat is provided. The ballistic back member comprises at least one adjustable telescopic strut configured for abutting against a vehicle floor and supporting the ballistic back member during driving.

8 Claims, 4 Drawing Sheets

(56) References Cited

U.S. PATENT DOCUMENTS

| | | | | |
|---|---|---|---|---|
| 5,419,614 | A * | 5/1995 | Richards | B60N 2/667 |
| | | | | 297/284.4 |
| 5,474,352 | A * | 12/1995 | Davies | B60R 21/12 |
| | | | | 296/24.3 |
| 6,073,884 | A * | 6/2000 | Lavergne | F41H 7/046 |
| | | | | 89/36.11 |
| 6,161,462 | A | 12/2000 | Michaelson | |
| 6,164,181 | A * | 12/2000 | Bruner | F41H 5/0457 |
| | | | | 89/36.02 |
| 6,286,882 | B1 * | 9/2001 | Rastetter | F41H 7/048 |
| | | | | 296/24.41 |
| 6,688,554 | B2 * | 2/2004 | Weekly | B64D 45/0044 |
| | | | | 244/118.5 |
| 7,493,844 | B2 * | 2/2009 | Martin | F41H 5/0407 |
| | | | | 89/36.01 |
| 8,087,341 | B2 * | 1/2012 | Adler | F41H 5/013 |
| | | | | 89/36.08 |
| 8,434,805 | B1 * | 5/2013 | Bonniville | B60R 21/12 |
| | | | | 296/68.1 |
| 10,663,264 | B1 * | 5/2020 | Spradlin, Sr. | F41H 5/013 |
| 2002/0092416 | A1 * | 7/2002 | Cohen | F41H 5/06 |
| | | | | 89/36.05 |
| 2006/0175856 | A1 * | 8/2006 | Colin | B60R 21/12 |
| | | | | 296/24.3 |
| 2006/0243126 | A1 * | 11/2006 | Tyler | F41H 5/06 |
| | | | | 89/36.01 |
| 2010/0043195 | A1 * | 2/2010 | Howard | F41H 5/013 |
| | | | | 29/428 |
| 2010/0201148 | A1 * | 8/2010 | Storer | B60R 21/12 |
| | | | | 296/24.46 |
| 2012/0007408 | A1 * | 1/2012 | Freienstein | B60R 21/0134 |
| | | | | 297/464 |
| 2012/0043781 | A1 * | 2/2012 | Warren | F41H 5/06 |
| | | | | 296/97.5 |
| 2014/0238225 | A1 * | 8/2014 | Mickiewicz | F41H 5/26 |
| | | | | 89/36.07 |
| 2020/0256648 | A1 * | 8/2020 | Venter | B60R 21/12 |
| 2021/0339696 | A1 * | 11/2021 | Morales | B60R 21/12 |

* cited by examiner

ABLE FOR BALLISTICALLY
PROTECTING A DRIVER OR PASSENGER
IN A CIVILIAN VEHICLE

REFERENCE TO RELATED PUBLICATIONS

This application is claims priority from U.S. Provisional Pat. Appl. No. 63/106,413, filed on Oct. 28, 2020 which are incorporated by reference in their entirety.

FIELD OF THE INVENTION

The present invention relates to interior vehicular protecting arrangements and, more particularly, to ballistic shields.

BACKGROUND OF THE INVENTION

Military vehicles are commonly armored to withstand the impact of shrapnel, bullets, missiles or shells, protecting the personnel inside from enemy fire. Such vehicles include armored fighting vehicles like tanks, aircraft and ships.

Civilian vehicles may also be armored. These vehicles include cars used by officials (e.g., presidential limousines), reporters and others in conflict zones or where violent crime is common. Civilian armored cars are also routinely used by security firms to carry money or valuables to reduce the risk of highway robbery or the hijacking of the cargo.

U.S. Pat. No. 6,161,462 discloses a bulletproof blanket for use with law enforcement vehicles, including a plurality of envelopes containing panels. Each of the panels is fabricated of a lightweight material. Each of the envelopes containing panels has a short lower horizontal edge, an upper edge, and long vertical side edges therebetween. A plurality of flexible connector straps are vertically positioned between adjacent edges of the envelopes. Each of the straps has a first edge coupled to an envelope adjacent one edge and a second edge coupled to an adjacent envelope. In this manner the envelopes containing panels may be positioned in an essentially vertical plane when deployed for operation and use. The envelopes containing panels may also be positioned in a stacked parallel planar array, accordion style, for storage and transportation.

CN207850188 discloses a shellproof backplate with car seat cooperation use, including this somatic part, this somatic part include headrest portion, with the lower extreme integrated into one piece's of headrest portion transition portion and with the lower extreme integrated into one piece's of transition portion backplate portion, this somatic part constructs for bulletproof material spare, this somatic part coat is drawn together at least one and is suitable for the connecting piece of being connected with car seat. According to the utility model discloses a shellproof backplate with car seat cooperation use, this armor are suitable for and are connected with car seat, improved car seat's bulletproof property, have improved the bulletproof property at the car seat's that corresponds rear portion, and simultaneously, this armor can be very conveniently be pulled down from car seat, and when taking place emergency, this armor can regard as the shield to use, and it is nimble convenient to use, the integral protective performance of the car of improvement.

IL 184533 discloses means for ballistic protection from explosions and weapons fire for occupants of a motor vehicle comprising three or four largely planar units composed of material proven to be capable of resisting small arms fire. These units are linked by hinges to for a protective shell on three or four sides of the occupant(s), and are optionally provided with ballistic grade windows. The hinges or other attachment means can be rapidly detached, within a matter of seconds. Then each unit may be used as a personal shield. The side units may be optionally provided with ballistic grade windows to allow side and/or front visibility. The device is modular and designed to fit within most passenger motor vehicles such as cars, jeeps, personnel carriers, aircraft, helicopters, etc.

The abovementioned ballistic protection arrangements do not include means for mounting it within a civilian car. In other words, they are not reliably secured within the civilian car and can move during driving. Thus, there is a long-felt and unmet need to provide a ballistic protection arrangement reliably securable within the car in order to prevent the ballistic protection arrangement from displacement from the mounting place under potential hostile activity.

SUMMARY OF THE INVENTION

It is hence one object of the invention to disclose an arrangement for ballistically protecting a driver or passenger in a civilian vehicle. The aforesaid arrangement comprises: (a) a back ballistic member mechanically securable to a rear surface of a back of a driver or passenger seat; (b) a first side ballistic member connected to the back member by at least one hinge such that the first side member is angularly displaceable relative to the back member; the first side ballistic member comprising a transparent ballistic portion; and (c) a second side member connected to the back member at an opposite side of the back member.

It is a core purpose of the invention to provide the second member is linearly adjustable relative to the back portion such that mechanical contact between the back of the driver or passenger seat is provided. The ballistic back member comprises at least one adjustable telescopic strut configured for abutting against a vehicle floor and supporting the ballistic back member during driving.

Another object of the invention is to disclose the back ballistic member secured to the rear surface of the back of the driver or passenger seat by means of at least one strap embracing the back of the driver or passenger seat.

A further object of the invention is to disclose at least one adjustable strut provided with a thrust roller.

A further other object of the invention is to disclose the second side member connected to the back member by mean of at least one bar being linearly movable within a guideway secured to the back ballistic member.

A further other object of the invention is to disclose at least one hinge configured for releasably connecting said first side ballistic member to said back ballistic member such that said first side ballistic member is usable by said driver or passenger outside said civilian vehicle, as needed.

A further other object of the invention is to disclose the first side ballistic member provided with a handle for manually holding thereof by said driver or passenger.

A further other object of the invention is to disclose the back and side members made of a material selected from a group consisting of: Kevlar®, Dyneema®, polyethylene, ceramic, armor steel and combinations thereof.

A further other object of the invention is to disclose a method of ballistically protecting a driver or passenger in a civilian vehicle. The aforesaid method comprises steps of: (a) providing an arrangement for ballistically protecting a driver or passenger in a civilian vehicle; the arrangement comprising: (i) a back ballistic member mechanically securable to a rear surface of a back of a driver or passenger seat; (ii) a first side ballistic member connected to the back member by at least one hinge such that the first side member is angularly displaceable relative to the back member; the first side ballistic member comprising a transparent ballistic portion; and (iii) a second side member connected to the back member at an opposite side of the back member; the second member is linearly adjustable relative to the back portion such that mechanical contact between the back of the driver or passenger seat is provided; the ballistic back member comprises at least one adjustable telescopic strut configured for abutting against a vehicle floor and supporting the ballistic back member during driving; (b) inserting the arrangement into a vehicle; (c) securing the back ballistic member mechanically to the rear surface of the back of the driver or passenger seat by means of at least one strap embracing the back therearound; (d) linearly adjusting the second member up to mechanical contact between the back of the driver or passenger seat; (e) drawing down the at least one adjustable telescopic strut up to abutting against a vehicle floor and supporting the ballistic back member during driving.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide an isometric view of an arrangement for ballistically protecting a driver or passenger and a method of implementing the same.

Figure 1A:
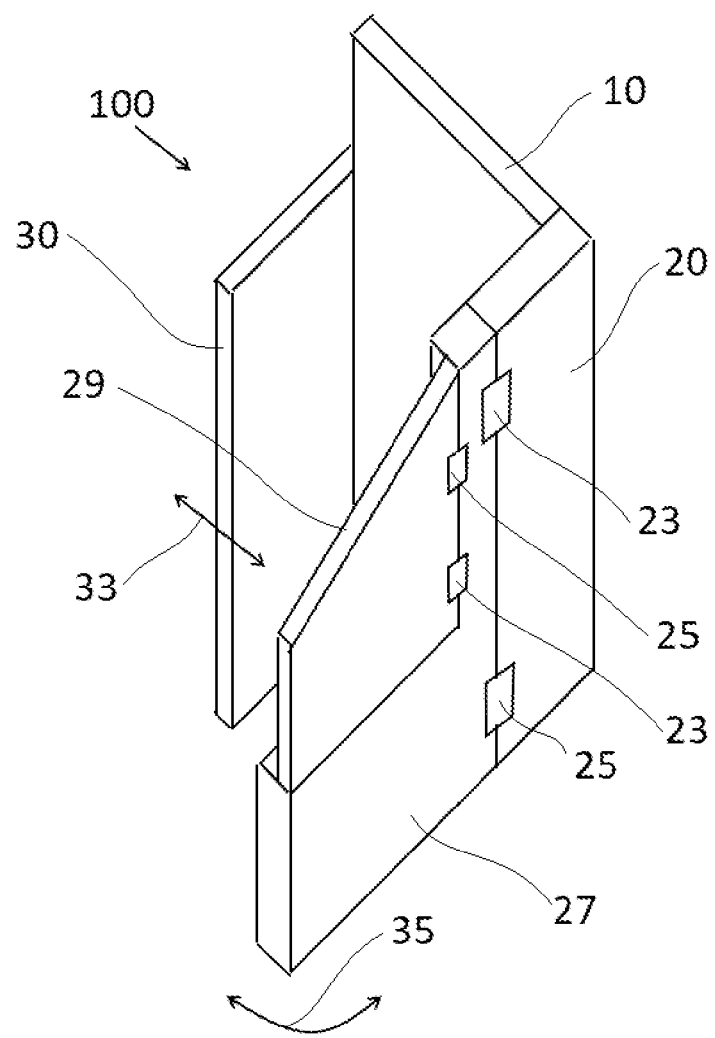
FIGS. 1a and 1b are isometric views of an arrangement for ballistically protecting a driver and a passenger in a civilian vehicle mounted on driver and passenger seats, respectively.
Figure 1B:
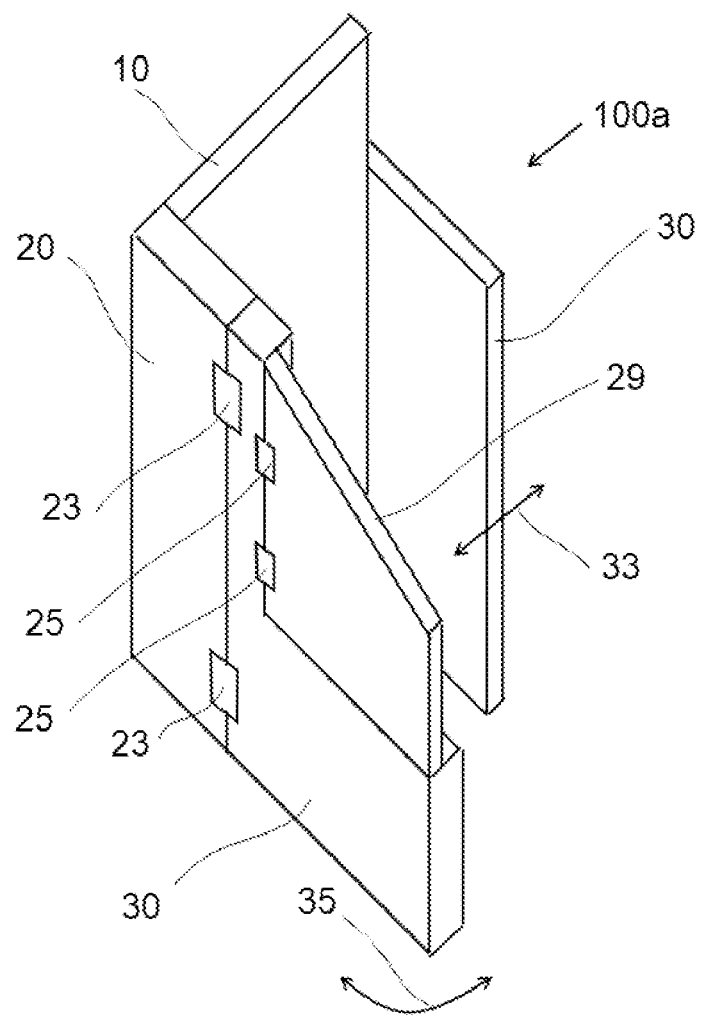

Reference is now made to FIGS. 1a and 1b showing exemplary embodiments 100 and 100a of the present invention, which are mountable on driver and passenger seats, respectively. Embodiments 100 and 100a each comprise back ballistic member 10, side ballistic member 20 hard mounted on back ballistic member 10. Side ballistic member 27 is hingedly connected to side ballistic member 20. Numeral 23 refers to hinges providing angular displacement of side ballistic member 27 relative to side ballistic member 20 hard mounted on back ballistic member 10. According to one embodiment of the present invention, at least one hinge 23 is configured for releasably connecting said first side ballistic member to said back ballistic member such that said first side ballistic member is usable by said driver or passenger outside the civilian vehicle, as needed. Side ballistic member 27 is provided with a handle (not shown) for manually holding thereof by the driver or passenger. Side ballistic member 27 has a transparent ballistic member (bulletproof glass) 29 connected to side ballistic member 27 by clamps 25. Side ballistic member 30 is mounted on back ballasting member 10 to be displaced relative to back ballasting member 10 in the direction indicated by arrows 33. Depending on intended use and protection grade to be required, members 10, 20 and 30 can be made of materials such as Kevlar®, Dyneema®, polyethylene or ceramic. Armor steel plates of classes 1 to 4 (US MIL-A 12560) are also in the scope of the invention.

Figure 2:
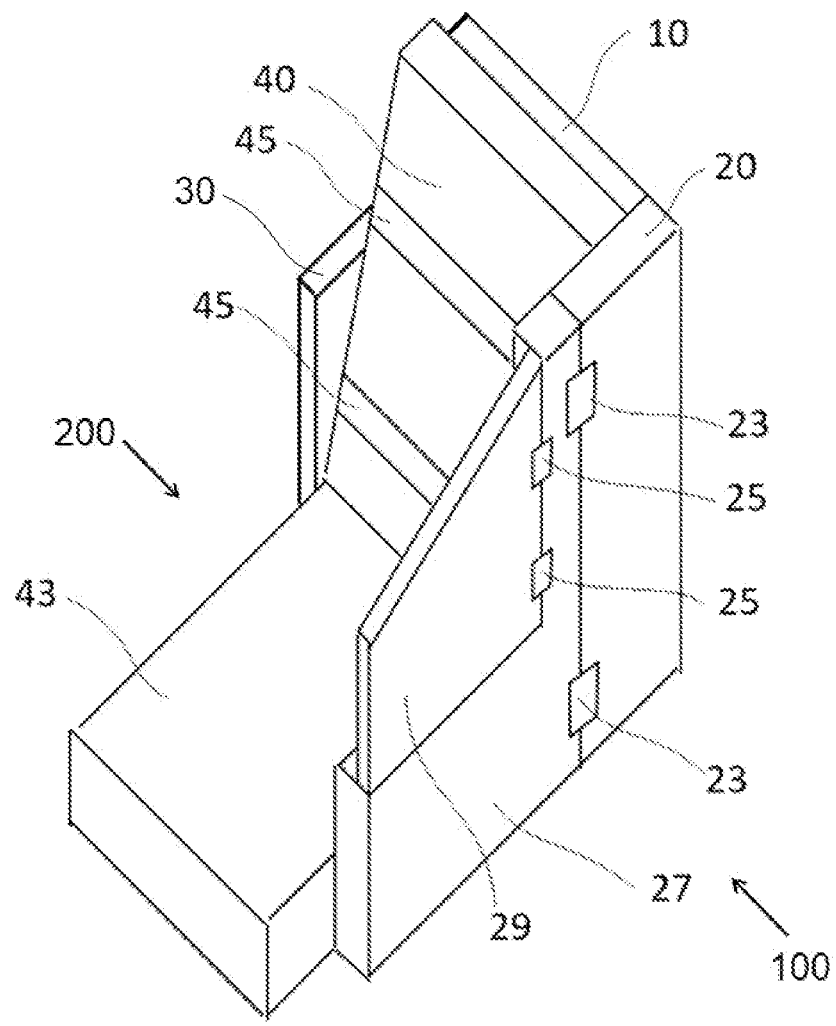
FIG. 2 is an isometric view of an arrangement for ballistically protecting a driver or passenger.

Reference is now made to FIG. 2 presenting arrangement 100 mounted on driver/passenger seat 200. Specifically, rigid positioning arrangement 100 relative seat back 40 is provided by straps 45 tightly embracing seat back 40. In addition, seat back 40 is gripped between side members 20 and 30. Numeral 43 refers to a bottom portion of seat 200.

Figure 3:
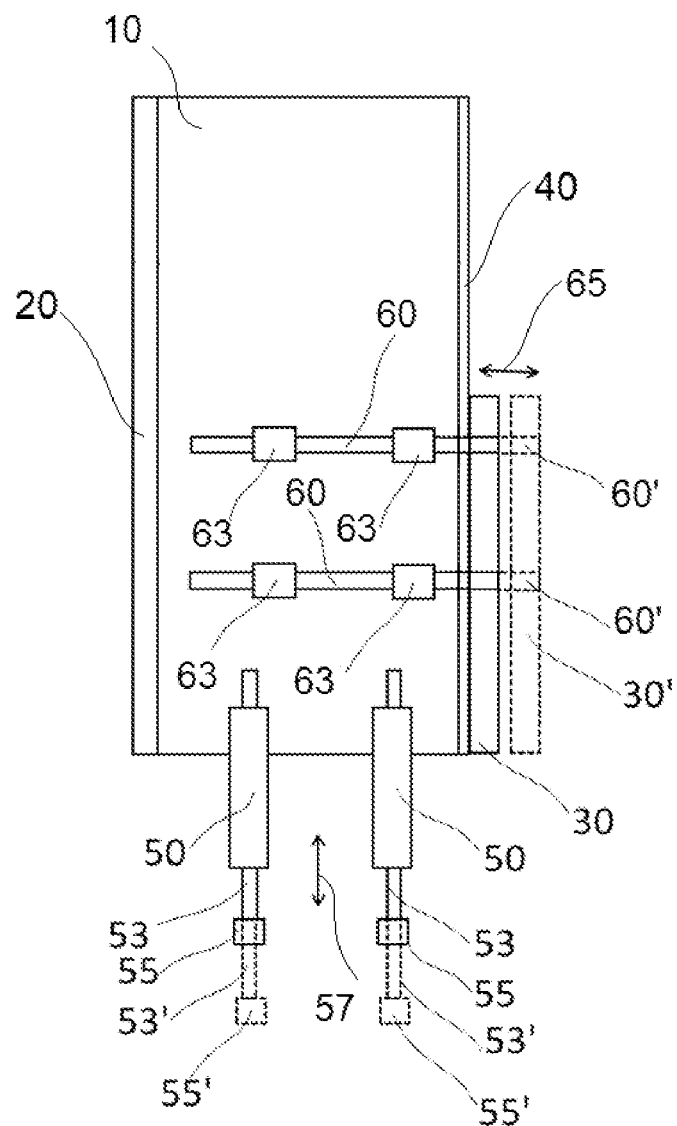
FIG. 3 is a back view of an isometric view of an arrangement for ballistically protecting a driver or passenger.

Reference is now made to FIG. 3 illustrating a procedure of mounting an arrangement for ballistically protecting a driver or passenger in a civilian vehicle. Specifically, back ballistic member 10 is strapped to seat back 40 (not shown). As shown in FIG. 2, seat back is gripped by side ballistic members 20 and 30. For this purpose, side member 30 is drawn in direction 65 up to mechanical contact with seat back 40. Side member 30 is mechanically connected to back member 10 by means of bars 60 linearly movable within guideways 63 secured to back member 10. Side member 30 is lockable in a desired position by arresters (not shown).

Adjustable telescopic struts 53 are configured for abutting against a vehicle floor (not shown) and supporting ballistic back member 10 during driving. After strapping and gripping seat back 40, telescopic struts 53 are deployed downward in direction 57 from base member 50 secured to back member 10 up to reaching the vehicle floor. According to one embodiment of the present invention, adjustable struts 53 are provided with thrust rollers 55. Struts 53 are lockable in a desired position by arresters (not shown).

Prime marks indicate exemplary positions of elements 30, 50, 53, 55 and 60.

According to the present invention, an arrangement for ballistically protecting a driver or passenger in a civilian vehicle is disclosed. The aforesaid arrangement comprises: (a) a back ballistic member mechanically securable to a rear surface of a back of a driver or passenger seat; (b) a first side ballistic member connected to the back member by at least one hinge such that the first side member is angularly displaceable relative to the back member; the first side ballistic member comprising a transparent ballistic portion; and (c) a second side member connected to the back member at an opposite side of the back member.

It is a core feature of the invention to provide the second member is linearly adjustable relative to the back portion such that mechanical contact between the back of the driver or passenger seat is provided. The ballistic back member comprises at least one adjustable telescopic strut configured for abutting against a vehicle floor and supporting the ballistic back member during driving.

According to one embodiment of the present invention, the back ballistic member is secured to the rear surface of the back of the driver or passenger seat by means of at least one strap embracing the back of the driver or passenger seat.

According to another embodiment of the present invention, at least one adjustable strut is provided with a thrust roller.

According to a further embodiment of the present invention, the second side member is connected to the back member by mean of at least one bar being linearly movable within a guideway secured to the back ballistic member.

According to a further embodiment of the present invention, at least one hinge is configured for releasably connecting said first side ballistic member to said back ballistic member such that said first side ballistic member is usable by said driver or passenger outside said civilian vehicle, as needed.

According to a further embodiment of the present invention, the first side ballistic member is provided with a handle for manually holding thereof by said driver or passenger.

According to a further embodiment of the present invention, the back and side members are made of a material selected from a group consisting of: Kevlar®, Dyneema®, polyethylene, ceramic, and combinations thereof.

According to a further embodiment of the present invention, a method of ballistically protecting a driver or passenger in a civilian vehicle is disclosed. The aforesaid method comprises steps of: (a) providing an arrangement for ballistically protecting a driver or passenger in a civilian vehicle; the arrangement comprising: (i) a back ballistic member mechanically securable to a rear surface of a back of a driver or passenger seat; (ii) a first side ballistic member connected to the back member by at least one hinge such that the first side member is angularly displaceable relative to the back member; the first side ballistic member comprising a transparent ballistic portion; and (iii) a second side member connected to the back member at an opposite side of the back member; the second member is linearly adjustable relative to the back portion such that mechanical contact between the back of the driver or passenger seat is provided; the ballistic back member comprises at least one adjustable telescopic strut configured for abutting against a vehicle floor and supporting the ballistic back member during driving; (b) inserting the arrangement into a vehicle; (c) securing the back ballistic member mechanically to the rear surface of the back of the driver or passenger seat by means of at least one strap embracing the back therearound; (d) linearly adjusting the second member up to mechanical contact between the back of the driver or passenger seat; (e) drawing down the at least one adjustable telescopic strut up to abutting against a vehicle floor and supporting the ballistic back member during driving.

The invention claimed is:

1. An arrangement for ballistically protecting a driver or passenger in a civilian vehicle; said arrangement comprising:
   a. a back ballistic member mechanically securable to a rear surface of a back of a driver or passenger seat;
   b. a first side ballistic member connected to said back member by at least one hinge such that said first side member is angularly displaceable relative to said back member; said first side ballistic member comprising a transparent ballistic portion; and
   c. a second side member connected to said back member at an opposite side of said back member;
      wherein said second member is linearly adjustable relative to said back portion such that mechanical contact between said back of said driver or passenger seat is provided;
      wherein said ballistic back member comprises at least one adjustable telescopic strut configured for abutting against a vehicle floor and supporting said ballistic back member during driving.

2. The arrangement according to claim 1, wherein said back ballistic member is secured to said rear surface of said back of said driver or passenger seat by means of at least one strap embracing said back of said driver or passenger seat.

3. The arrangement according to claim 1, wherein said at least one adjustable strut is provided with a thrust roller.

4. The arrangement according to claim 1, wherein said second side member connected to said back member by mean of at least one bar is linearly movable within a guideway secured to said back ballistic member.

5. The arrangement according to claim 1, wherein said at least one hinge is configured for releasably connecting said first side ballistic member to said back ballistic member such that said first side ballistic member is usable by said driver or passenger outside said civilian vehicle, as needed.

6. The arrangement according to claim 5, wherein said first side ballistic member is provided with a handle for manually holding thereof by said driver or passenger.

7. The system of claim 1 wherein said back and side members are made of a material selected from a group consisting of: Kevlar®, Dyneema®, polyethylene, ceramic, armor steel and combinations thereof.

8. A method of ballistically protecting a driver or passenger in a civilian vehicle; said method comprising steps of:
   a. providing an arrangement for ballistically protecting a driver or passenger in a civilian vehicle; said arrangement comprising:
      i. a back ballistic member mechanically securable to a rear surface of a back of a driver or passenger seat;
      ii. a first side ballistic member hingedly connected to said back member such that said first side member is angularly displaceable relative to said back member; said first side ballistic member comprising a transparent ballistic portion; and
      iii. a second side member connected to said back member at an opposite side of said back member;
         wherein said second member is linearly adjustable relative to said back portion such that mechanical contact between said back of said driver or passenger seat is provided;
         wherein said ballistic back member comprises at least one adjustable telescopic strut configured for abutting against a vehicle floor and supporting said ballistic back member during driving;
   b. inserting said arrangement into a vehicle;
   c. securing said back ballistic member mechanically to said rear surface of said back of said driver or passenger seat by means of at least one strap embracing said back therearound;
   d. linearly adjusting said second member up to mechanical contact between said back of said driver or passenger seat;
   e. drawing down said at least one adjustable telescopic strut up to abutting against a vehicle floor and supporting said ballistic back member during driving.

* * * * *